US011387913B2

(12) United States Patent
Innes

(10) Patent No.: US 11,387,913 B2
(45) Date of Patent: Jul. 12, 2022

(54) SYSTEM AND METHOD FOR PROVISIONING OF ENTANGLED-PHOTON PAIRS

(71) Applicant: AT&T Intellectual Property I, L.P., Atlanta, GA (US)

(72) Inventor: Timothy Innes, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 517 days.

(21) Appl. No.: 16/426,891

(22) Filed: May 30, 2019

(65) Prior Publication Data

US 2020/0382219 A1  Dec. 3, 2020

(51) Int. Cl.
*H04B 10/70* (2013.01)
*H04L 9/08* (2006.01)
(Continued)

(52) U.S. Cl.
CPC .......... *H04B 10/70* (2013.01); *H04L 9/0833* (2013.01); *H04L 9/0852* (2013.01); *H04Q 11/0005* (2013.01); *H04W 12/04* (2013.01)

(58) Field of Classification Search
CPC ..... H04B 10/70; H04L 9/0833; H04L 9/0852; H04L 9/0869; H04Q 11/0005; H04W 12/04
See application file for complete search history.

(56) References Cited

U.S. PATENT DOCUMENTS 7,428,562 B2  9/2008  Beausoleil et al.
7,518,120 B2  4/2009  Monroe et al.
(Continued)

FOREIGN PATENT DOCUMENTS

CN  204271442 U  4/2015
WO  03101013 A1  12/2003
(Continued)

OTHER PUBLICATIONS

Chen, et al., "Fault-tolerant quantum repeater with atomic ensembles and linear optics", 2007, 12 pages.
(Continued)

*Primary Examiner* — Abiy Getachew
(74) *Attorney, Agent, or Firm* — Guntin & Gust, PLC; Matthew Tropper

(57) ABSTRACT

Aspects of the subject disclosure may include, for example, determining a multi-bit value, adjusting an orbital angular momentum of a photon according to the multi-bit value, and generating a quantum entangled pair of photons based on the photon, wherein the quantum entangled pair of photons includes the orbital angular momentum according to the multi-bit value. A quantum state is applied to the quantum entangled pair of photons, while preserving the orbital angular momentum according to the multi-bit value. A photon of the quantum entangled pair of photons is directed to an addressable memory element adapted to store a number of entangled pairs of photons including the quantum entangled pair of photons. The photons of the entangled pair of photons are retrievable from the addressable memory element according to the multi-bit value to obtain a retrieved entangled pair of photons having the quantum state. Other embodiments are disclosed.

20 Claims, 13 Drawing Sheets

(51) Int. Cl.
*H04W 12/04* (2021.01)
*H04Q 11/00* (2006.01)

(56) References Cited

U.S. PATENT DOCUMENTS

| | | | |
|---|---|---|---|
| 7,532,400 | B2 | 5/2009 | Zoller et al. |
| 7,570,419 | B2 | 8/2009 | Edamatsu et al. |
| 7,667,995 | B1 | 2/2010 | Leuenberger et al. |
| 8,103,172 | B2 | 1/2012 | Peters et al. |
| 8,190,553 | B2 | 5/2012 | Routt |
| 8,269,978 | B2 | 9/2012 | Capron et al. |
| 8,537,649 | B2 | 9/2013 | Shields et al. |
| 8,983,303 | B2 | 3/2015 | Meyers et al. |
| 9,103,975 | B2 | 8/2015 | Yu et al. |
| 9,111,229 | B2 | 8/2015 | Harrison et al. |
| 9,264,225 | B1 | 2/2016 | Hunt et al. |
| 9,270,385 | B2 | 2/2016 | Meyers et al. |
| 9,350,460 | B2 | 5/2016 | Paik |
| 9,800,399 | B2 | 10/2017 | Tanzilli et al. |
| 10,581,522 | B1 | 3/2020 | Innes et al. |
| 2004/0095582 | A1* | 5/2004 | Holbrook ............ G01M 11/331 356/491 |
| 2008/0258049 | A1* | 10/2008 | Kuzmich ............ B82Y 10/00 250/214.1 |
| 2009/0016386 | A1* | 1/2009 | Edamatsu ............ B82Y 10/00 250/503.1 |
| 2012/0126810 | A1 | 5/2012 | Elgort et al. |
| 2013/0301094 | A1* | 11/2013 | Gilbert ............ G02F 1/0136 359/107 |
| 2013/0322873 | A1 | 12/2013 | Stevenson et al. |
| 2016/0112192 | A1* | 4/2016 | Earl ............ H04L 9/0852 380/44 |
| 2018/0136688 | A1 | 5/2018 | Gilbert et al. |
| 2018/0254085 | A1 | 9/2018 | Brown et al. |
| 2018/0301863 | A1 | 10/2018 | Aitken et al. |
| 2018/0322921 | A1 | 11/2018 | Brown et al. |
| 2018/0330266 | A1 | 11/2018 | Simmons et al. |
| 2021/0105135 | A1* | 4/2021 | Figueroa ............ H04L 9/0858 |

FOREIGN PATENT DOCUMENTS

| | | |
|---|---|---|
| WO | 2005008953 A1 | 1/2005 |
| WO | 2011073656 A1 | 6/2011 |
| WO | 2015087257 A2 | 6/2015 |
| WO | 2017067044 A1 | 4/2017 |

OTHER PUBLICATIONS

Christoph, et al., "Quantum storage of photonic entanglement in a crystal", 2011, 10 pages.

Dur, et al., "Quantum repeaters based on entanglement purification", 1999, 19 pages.

Nagali, et al., "Quantum information transfer from spin to orbital angular momentum of photons", 2009, 4 pages.

* cited by examiner

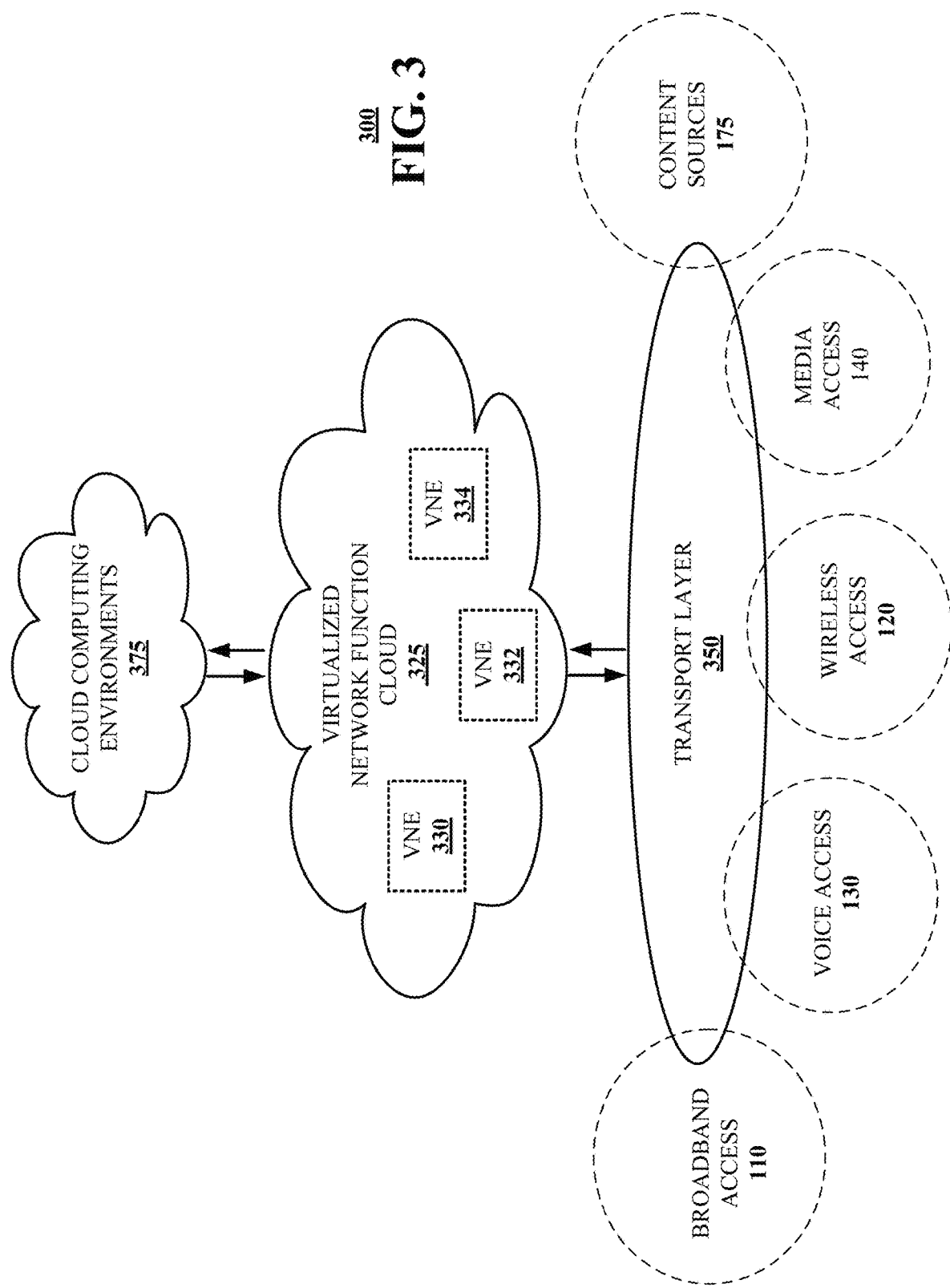

SYSTEM AND METHOD FOR PROVISIONING OF ENTANGLED-PHOTON PAIRS

FIELD OF THE DISCLOSURE

The subject disclosure relates to a system and method for provisioning of entangled-photon pairs.

BACKGROUND

Quantum communications relates to a transmission of quantum states, sometimes referred to as quantum bits or qubits, from one place to another. By way of example, a quantum bit emitter includes a photon source and an encoder making it possible to encode each bit of information to be transmitted according to a quantum state of a particle, such as a photon. The quantum state refers to a state encoded onto a property of the particle, i.e., photon, sometimes referred to as a quantum observable. For example, the property can include one of a polarization, a wavelength or an emission time. The photons can be transmitted in free space, or in a guided manner, e.g., via a waveguide, such as an optical fiber. The encoded photons are directed toward a receiver adapted to analyze the quantum bits to detect the encoded information. The receiver may include one or more photon detectors adapted to analyze or otherwise determine the quantum state.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
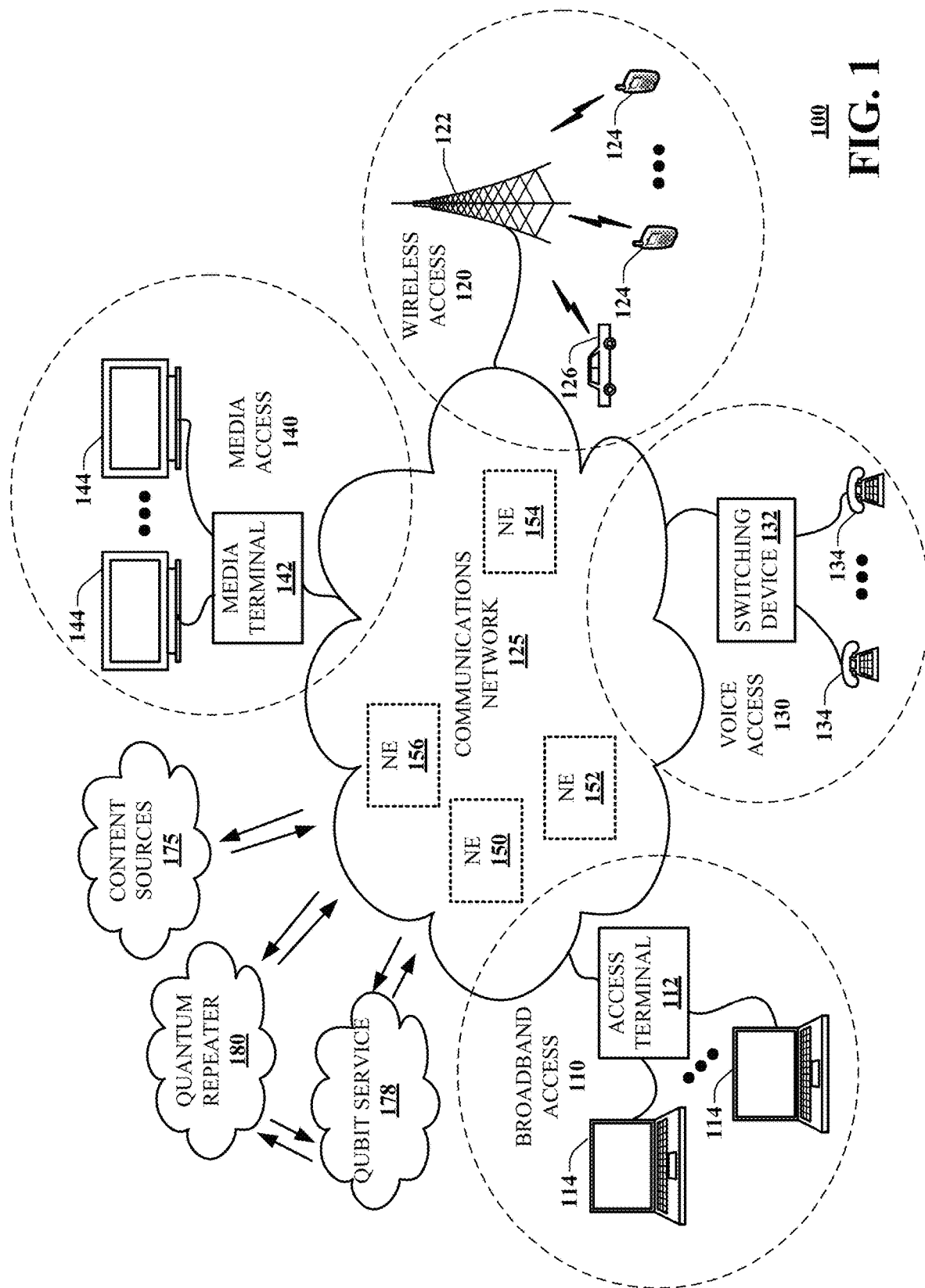
FIG. 1 is a block diagram illustrating an exemplary, non-limiting embodiment of a communications network in accordance with various aspects described herein.

The subject disclosure describes, among other things, illustrative embodiments for provisioning photons for application in quantum teleportation. Entangled photon pairs are generated and stored in a solid-light quantum memory as a reservoir for the entangled-photon pairs. In at least some embodiments, an orbital angular momentum of a photon, sometimes referred to as "twisted light" is applied to label or otherwise tag a single photon with a multi-bit serial number. Alternatively or in addition, destructive quantum noise is reduced and/or removed through filtering techniques, such as squeezing light and/or quantum nano-drums to purify photons of the entangled pair. Other embodiments are described in the subject disclosure.

One or more aspects of the subject disclosure include a process that includes generating a photon to obtain a generated photon, receiving a label value, adjusting an orbital angular momentum of the generated photon according to the label value, and generating a quantum entangled pair of photons based on the generated photon. The quantum entangled pair of photons include the orbital angular momentum according to the label value. A quantum state is applied to the quantum entangled pair of photons, while preserving the orbital angular momentum according to the label value. Individual photons are stored to obtain stored photons of the quantum entangled pair of photons in an addressable memory element adapted to store a number of entangled pairs of photons including the entangled photon pair, wherein the photons of the entangled pair of photons are retrievable from the memory element to obtain a retrieved entangled pair of photons having the quantum state.

One or more aspects of the subject disclosure include a system, including a processing system including a processor and a memory that stores executable instructions that, when executed by the processing system, facilitate performance of operations. The operations include generating a photon to obtain a generated photon, identifying a label value, modifying an orbital angular momentum of the generated photon according to the label value, and generating a quantum entangled pair of photons based on the generated photon. The quantum entangled pair of photons include the orbital angular momentum according to the label value. A quantum state of the quantum entangled pair of photons is adjusted, while preserving the orbital angular momentum according to the label value. A photon of the quantum entangled pair of photons is stored to obtain a stored photons of the quantum entangled pair of photons in an addressable memory element adapted to store a plurality of entangled pairs of photons including the entangled photon pair. The photons of the entangled pair of photons are retrievable from the memory element to obtain a retrieved entangled pair of photons having the quantum state.

One or more aspects of the subject disclosure include a non-transitory, machine-readable medium, including executable instructions that, when executed by a processing system including a processor, facilitate performance of operations. The operations include determining a multi-bit value, adjusting an orbital angular momentum of a photon according to the multi-bit value, and generating a quantum entangled pair of photons based on the generated photon. The quantum entangled pair of photons include the orbital angular momentum according to the multi-bit value. A quantum state is applied to the quantum entangled pair of photons, while preserving the orbital angular momentum according to the multi-bit value. Individual photons are directed to an addressable memory element adapted to store a number of entangled pairs of photons including the entangled photon pair, wherein the photons of the entangled pair of photons are retrievable from the memory element to obtain a retrieved entangled pair of photons having the quantum state.

Referring now to FIG. 1, a block diagram is shown illustrating an example, non-limiting embodiment of a communications network 100 in accordance with various aspects described herein. For example, communications network 100 can facilitate in whole or in part a provisioning of entangled photon pairs for quantum teleportation of information across the network 100. Provisioned photons of the entangled photon pairs can be filtered to reduce and/or substantially eliminate quantum noise. Alternatively or in addition, multiple bits of information can be encoded onto individual photons and/or entangled pairs of photons according to the photons' orbital angular momenta.

Quantum teleportation refers to a transfer of quantum information (a qubit) from one location to another without that qubit being transmitted directly through the space between the sender and the receiver. As an example, this can be accomplished by a sender and a receiver each sharing one half of an entangled quantum system, e.g., entangled photon pair. When the sender wishes to send a qubit (quantum teleportation) the sender can perform a Bell measurement with sender's half of the shared entangled quantum system and the qubit to be transferred to the receiver. The outcome of the Bell measurement can be sent to the receiver over a classical channel and consists of two bits. When the receiver obtains the two bits, the receiver applies a remaining portion of the initially shared entangled state one of four unitary operations depending upon what the two bits indicate. A unitary operation may be performed by an element including, e.g., a half-wave plate and a quarter-wave plate. For example, if the identity matrix is to be applied, nothing is done with the remaining portion of the initially shared entangled state. If the two bits indicate that a first matrix is to be applied the half wave plate performs a ninety degree rotation. If a second, different matrix is to be applied, then two suitable quarter wave plate operations are performed. If a third different matrix is to be applied, then two suitable quarter wave plate operations followed by a suitable half wave plate operation is performed.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
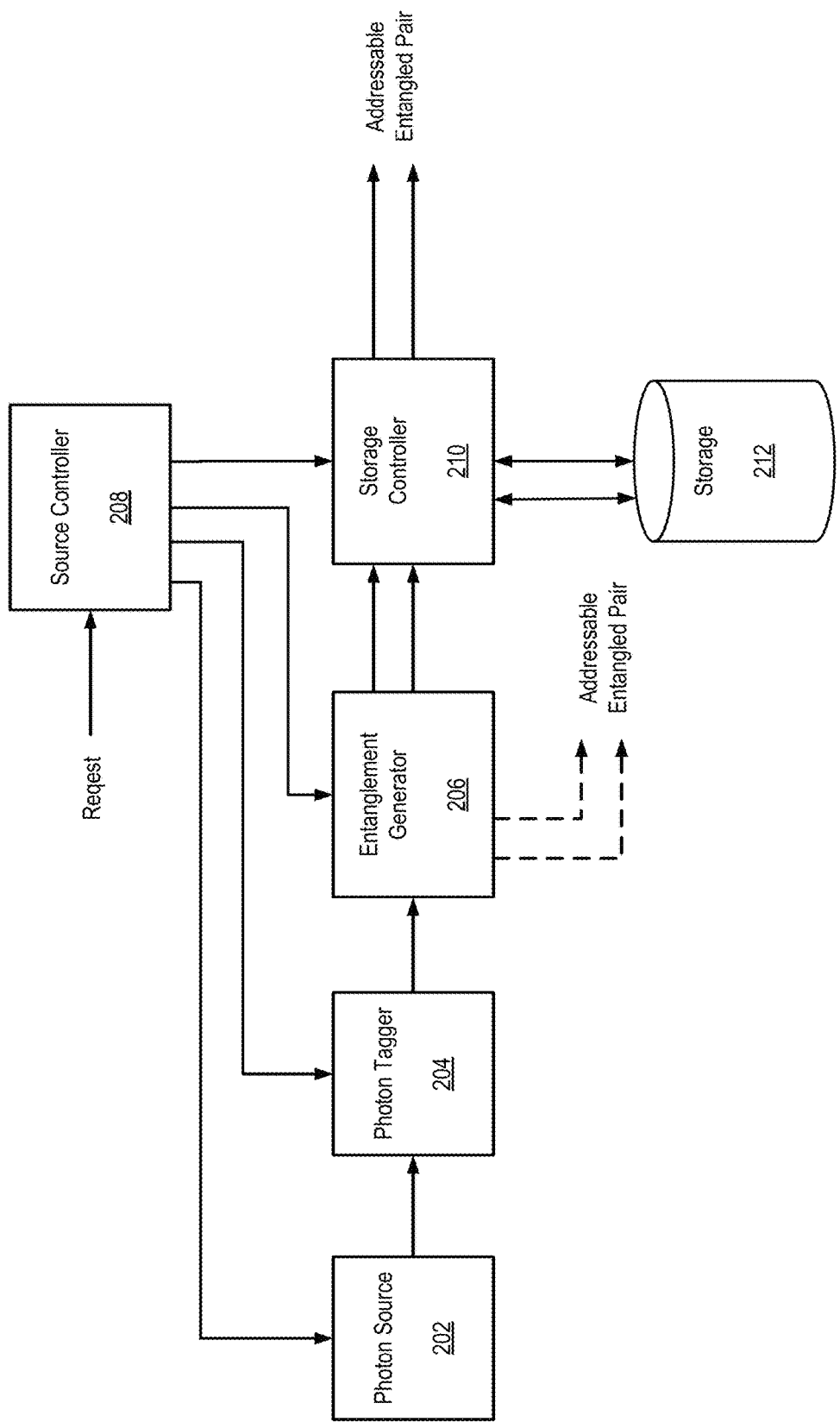
FIG. 2A is a block diagram illustrating an example, non-limiting embodiment of an entangled photon provisioning source functioning within the communication network of FIG. 1, in accordance with various aspects described herein.

FIG. 2A is a block diagram illustrating an example, non-limiting embodiment of an entangled photon provisioning system 200 functioning within the communication network of FIG. 1, in accordance with various aspects described herein. The example entangled photon provisioning system 200 includes a photon source 202, a photon labeler or tagger 204, an entanglement generator 206, a storage controller 210, and a storage element 212. The example entangled photon provisioning system 200 further includes a source controller 208 adapted to control operation of one or more of the photon source, the photon tagger 204, the entanglement generator 206 and the storage controller 210.

The photon source 202 can include without limitation, source of photons. Optical sources can include, without limitation, coherent devices, such as lasers or masers, non-coherent devices, such as light emitting diodes (LEDs), and combinations thereof. Lasers can include solid state lasers, e.g., semiconductor diode lasers, gas lasers, chemical lasers fiber lasers, photonic crystal lasers, and so on. Although the term optical sources is used, it is understood that devices may operate within and/or without a visible light region of the spectrum, e.g., within the infrared and/or ultraviolet spectra. In at least some embodiments, optical source devices can include millimeter wave and/or microwave devices, e.g., masers, and the like.

In at least some embodiments photons produced by the photon source 202 are coherent, e.g., produced by a laser. The laser can include a pump source to produce energetic coherent photons having an energy above a predetermined minimum threshold. For example, the predetermined minimum threshold level of the energetic photons can be determined according to a predetermined classical optical channel, e.g., such that the energetic photons maintain a minimum energy level after passage through the classical optical channel. In at least some embodiments, the minimum energy level can be determined according to one or more of a photon detector sensitivity, a path loss of the classical optical channel, a noise threshold, a quantum analyzer sensitivity, and the like. In some embodiments, the photon source 202 provides individual photons. Alternatively or in addition, the photon source 202 provides multiple photons, e.g., providing a group of multiple photons according to a single request received from the source controller 208.

In at least some embodiments, the photon source 202 can generate photons having characteristics suitable for an intended application. For example, the photon source 202 can generate photons having a wavelength adapted for telecommunication applications. By way of non-limiting example, the photon wavelengths can be one or more of 850, 1300 and 1550 nm for optical fiber channel applications.

Within the framework of quantum communications over long distances, photons at so-called "telecom" wavelengths have naturally come to the forefront as ideal support for quantum information because of their very weak interaction with the environment and of the low losses on propagation in standard optical fibers. Telecom wavelengths are defined by the International Telecommunications Union (ITU) in the form of standardized frequency bands (for example O, E, S, C, L, U). However, although very low, the transmission losses set a limit beyond which communication is no longer possible since the rate of detected photons becomes lower than the noise rate in the detector which remains the main limitation of the signal-to-noise ratio.

The photon labeler or tagger 204 receives one or more generated photons from the photon source 202. The photon tagger 204 determines a label value and adjusts an orbital angular momentum of the one or more generated photons according to the label value. Devices adapted for altering an orbital angular momentum include, without limitation, spiral phase plates. Spiral phase plates, or mirrors, can include spiral-shaped pieces of crystal and/or plastic that are engineered specifically to a predetermined topological charge and incident wavelength. Adjustable spiral phase plates can be made by providing an adjustable separation, e.g., by moving a wedge between two sides of a split or cracked piece of plastic. It is envisioned that other devices can be used to produce vortices of a photon or photon beam, such as a hologram, a deformable mirror, a birefringent liquid crystal plate, sometimes referred to as a q-plate. For example, a q-plate with a topological charge "q" can generate a ±2q charge vortex in an optical beam based on polarization of an input beam. Applications of orbital angular momentum devices, including modulators and demodulators and/or detectors are disclosed in U.S. patent application Ser. No. 16/211,809, entitled "Free-Space, Twisted Light Optical Communication System," filed on Dec. 6, 2018, the entire teachings of which are incorporated herein by reference in its entirety.

The orbital angular momentum of light refers to a component of angular momentum of a light beam or photon that is dependent on a field spatial distribution, and not on a polarization. High-order orbital angular momentum is a quantum mechanical state, one of the few that can be observed at the macroscopic level. It has become an attractive branch of studied due one its most intensely examined phenomena, Optical Vortices (OVs), which has found numerous applications, including; the ability to spin microscopic objects (known as an optical tweezer), create new forms of imaging systems, and behaves within nonlinear materials to give new insights into quantum optics.

In an optical vortex, otherwise known as "twisted light" or "topological charge", light is twisted like a corkscrew around its axis of travel. Because of the twisting, the light waves at the axis itself cancel each other out. When projected onto a flat surface, an optical vortex looks like a ring of light, with a dark hole in the center. This corkscrew of light, with darkness at the center, is called an optical vortex.

A source for emitting entangled photons, such as the entanglement generator 206, emits pairs of photons correlated on one of their quantum observables. Stated otherwise, the quantum state of each of the photons taken individually cannot be defined. Such a source of pairs of entangled photons can be based on nonlinear optics and include a conversion in a nonlinear crystal of a photon issuing from a pump beam, i.e., from the photon source 202 or tagger 204, into a pair of photons, this conversion occurring with a certain probability. Indeed, the regeneration of the optical signal by means of standard telecoms amplifiers (repeaters) is not possible in quantum communication on account of the so-called "non-cloning" theorem since it would disturb the signal in the same manner as would a spy in seeking to intercept the signal.

In some embodiments, the entanglement generator 206 provides one or more of the entangled photons for application to a source endpoint of a quantum teleportation system, e.g., a quantum transmitter, a destination endpoint of a quantum teleportation system, e.g., a quantum receiver or detector, and/or a quantum relay or repeater. Alternatively or in addition, the entanglement generator 206 provides one or both qubits of an entangled photon pair to a storage device.

According to the illustrative embodiment of the entangled photon provisioning system 200, one or more photons of an entangled pair of photons is directed by a storage controller 210 to a storage element 212. In at least some embodiments, the storage element 212 can include a crystal storage element. For example, a first individual photon of the quantum entangled pair of photons is applied to the crystal storage element 212. A first electric field can be applied to the crystal storage element 212 that together with the application of the photon alters a harmonic vibration of the crystal storage element 212 according to a quantum state of the photon. A second electric field can be applied to the crystal storage element 212. Application of the second electric field can occur at a later, unspecified time, and in response a retrieved photon is obtained from the crystal storage element, wherein the retrieved photon comprises the same quantum state of the stored photon. Application of the photon to a particular crystal or cell of a crystal storage element 212 can be controlled by the storage controller 210. Likewise, application of the first electric field to at least the crystal or cell of the crystal storage element 212 can be controlled by the storage controller 210, to initiate a "write" operation that stores the photon in the storage element 212. Similarly, application of the second electric field to at least the crystal or cell of the crystal storage element 212 that was previously adapted to store the harmonic vibration according to the stored photon to initiate a "read" operation, results in emission of a photon with the same quantum state. A write and/or read operation can be controlled in an addressable manner by the storage controller to obtain a particular photon, or a photon of a particular group of photons.

In some embodiments, the storage element 212 and/or the storage controller 210 provide one or more of the entangled photons for application to a source endpoint of a quantum teleportation system, e.g., a quantum transmitter, a destination endpoint of a quantum teleportation system, e.g., a quantum receiver or detector, and/or a quantum relay or repeater. Alternatively or in addition, the entanglement generator 206 provides one or both qubits of an entangled photon pair to a storage device.

The source controller 208 can be adapted to implement one or more instructions and/or rules that initiate generation of entangled photon pairs or qubits having a predetermined label or tag value impressed on the photon, e.g., by way of a photon's orbital angular momentum. The generated qubits can be used as generated and/or stored in the storage element 212 for later retrieval. It is understood that the entangled photon provisioning system 200 can develop a reservoir or pool of tagged or labeled qubits that can be stored and retrieved on an as needed basis.

Although the system elements of the example entangled photon provisioning system 200 are presented in a particular order, it is understood that the ordering of one or more of the system elements can be changed. For example, the photon tagger 204 can be arranged after the entanglement generator 206 to tag the entangled photon pairs. Alternatively or in addition, the photon tagger can be arranged after the storage controller 210 to tag the entangled photons and/or entangled photon pairs retrieved from the storage element 212.

Figure 2B:
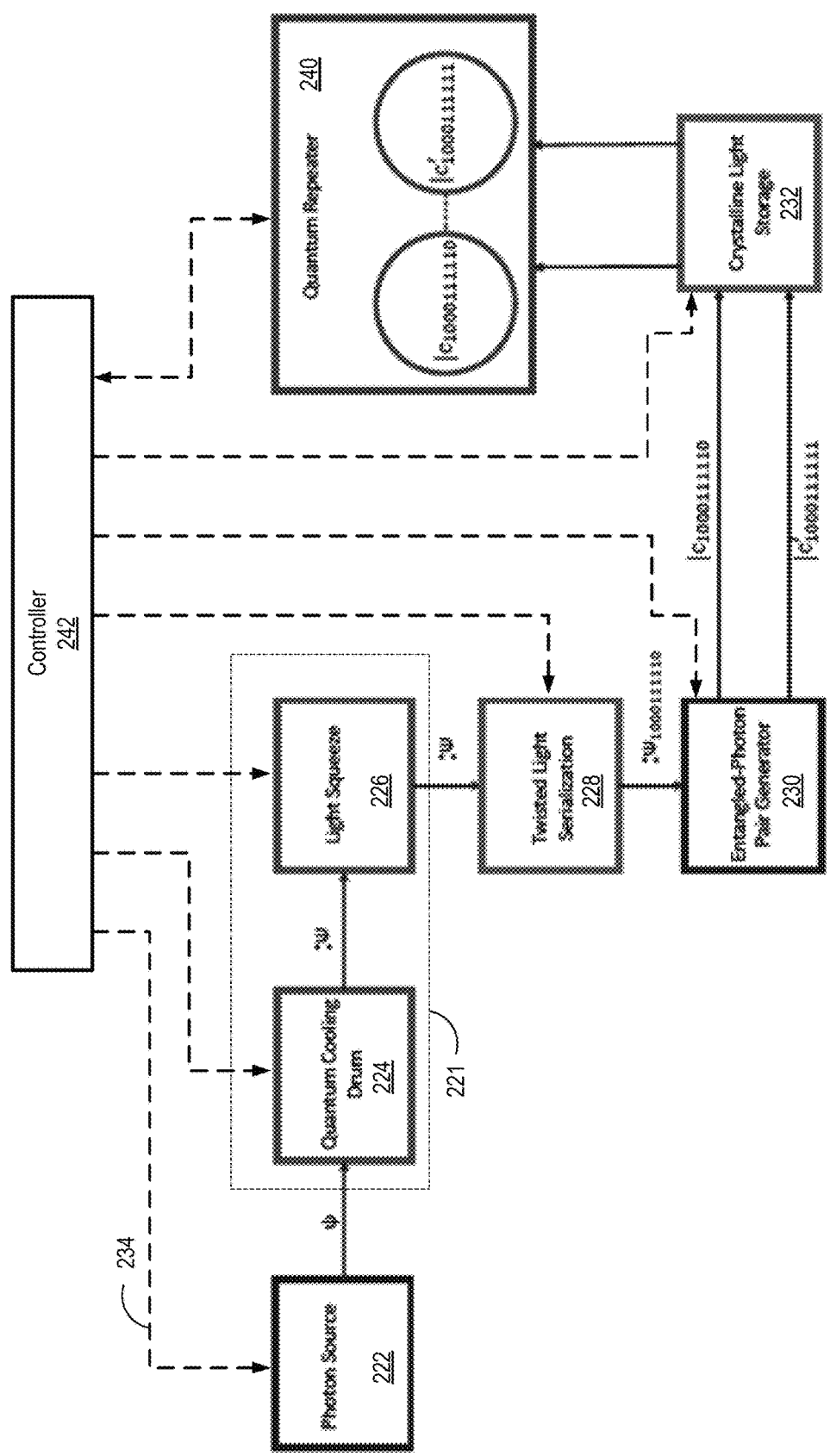
FIG. 2B is a block diagram illustrating an example, non-limiting embodiment of a quantum repeater functioning within the communication network of FIG. 1, in accordance with various aspects described herein.

FIG. 2B is a block diagram illustrating an example, non-limiting embodiment of a quantum repeater system 220 functioning within the communication network of FIG. 1, in accordance with various aspects described herein. The quantum repeater includes a self-replenishing reservoir of entangled-photon pairs. These will be the entangled-pairs that are used in the heart of the quantum repeater during the joint-measurement stage. In at least some embodiments, the entangled photon pairs are stored in a state of superposition on the state of optical polarization. Classical methods for optical amplification and optical repeating are too energetic for our entangled-photon pairs. In addition, current optical memory devices require a "read" on the data to be stored which will also shatter the superposition of states.

The example quantum repeater system 220 includes a photon source 222, a photon filter 221, a photon labeler or tagger 228, an entanglement generator 230, a crystalline light storage 232, and a quantum repeater 240. The example quantum repeater system 220 further includes a controller 242 adapted to control operation of one or more of the photon source 222, the photon filter 221, the photon tagger 228, the entanglement generator 230, the crystalline light storage 232 and the quantum repeater 240.

The photon source 222 generates individual photons and/or groups of photons having a predetermined characteristic. For example, the predetermined characteristic can include a wavelength and/or an energy level or range. In at least some embodiments, the photon source 222 is adapted to generate the one or more photons responsive to a control signal 234 provided by the controller 242.

The photon labeler or tagger 228 can be adapted to impress a predetermined value onto a physical property of a generated photon. In some instances the labeling or tagging process is referred to as serialization. To serialize each member of an entangled photon pair, a quantum information technique referred to as "twisted light," is applied to the photon. Twisted light refers to a photon having a twisted quantum mechanical state, e.g., a state of high-order orbital angular momentum. According to one analogy, imagine a football thrown in a perfect spiral, the rotation of the ball is like the angular momentum of the photon. With a type of optical lens (a spiral phase plate), a value of "r" extra quantum twists can be added to the angular momentum of the photon. This has an observable effect. A twisted laser beam projects a spot light, inscribed by a set of concentric dark bands.

And just like counting the rings of a tree to find its age, counting the bands around the spot light, will reveal the number of twists. This twisted light technique allows each photon to carry more than 1 bit of data per photon. For example, a 10 bit/photon data model would require 1023 twists to encode the largest number that 10 bits can hold, which is also 1023. Interestingly, there is no theoretical limit the amount of twists a photon can take, thus no limit to the amount of data a photon can carry.

In current fiber optic networking protocols, a photon can carry a maximum of one bit of data. But with twisted light that limit can be surpassed, without disrupting the superposition on the quantum mechanical state of polarization. According to eh illustrative example, a 10-bit serializer 228 is used (e.g. "XXXXXXXXXX" where X represents either a 0 or a 1, i.e., binary encoding). From left to right, the first 9 bits encode the serial number while the last bit represents the pair side (i.e. "0" refers to $|\Psi\rangle$ and "1" refers to $|\Psi'\rangle$). The serial number e.g., 453 in decimal, or "111000110" in binary, refers to a pair number, while the last bit designates the individual pair partner. Namely, 1110001100 refers to $|\Psi\rangle$ on pair 453, whereas 1110001101 refers to $|\Psi'\rangle$ on pair 453.

The filter 221 can be adapted to reduce and/or eliminate unwanted artifacts of the generated photon, such as quantum noise. The filter 221 can include a light squeezing device 226, a quantum cooling drum 224 or both. According to the illustrative example, the filter 221 includes both the quantum cooling drum 224 and the light squeezing device 226.

It is understood that energy injected into a quantum system can disrupt a fragile entangled photon pair relationship. Furthermore, reading a quantum particle in a state of superposition will collapse the superposition. For these reasons, a traditional approach of photon amplification used in optical fiber networks is not suitable for entangled photons that are in a state of superposition. To amplify a regular photon, one combines it with another light pulse of a higher intensity, their combined intensity if an average of the original constituents. But they have to be separated so that the original photon stream regains data coherence. Therefore, traditional amplification processes would disrupt quantum entanglement, and the separation of the combined light pulse would act like a measurement and shatter the superposition. This can be overcome by using an entanglement swapping strategy. The disclosed photon creation process supports a practical scalability, providing both high performance and increased efficiency, by providing substantially pure photon "blanks" upon which to generate entangled pair within the quantum repeater system 220.

At a scale of a photon, macroscopic energy transfers like radiation, convection and conduction are less important than quantum energy transfer involving phonons, i.e., a phonon is a quantum of energy or a quasiparticle associated with a compressional wave such as sound or a vibration of a crystal lattice. It is these phonons that contribute to the quantum noise that can negatively impact, and in at least some instances, shatter the superposition state of generated entangled-photon pairs. It is understood that the additive effect extraneous phonons within a beam of light can be reduced by passing the photons through a quantum cooling drum 224.

The quantum cooling drum 224 is a microscopic structure that has nano sized holes which allow only the pure photon, i.e., minus any phonons to pass through. By analogy, the quantum cooling drum 224 is a "bouncy castle" with a bunch of children jumping up and down within the castle. The castle, however, has only one opening for the smallest child to pass through. The smallest child represents the pure photon, whereas the larger children represent phonons.

In some embodiments, a quantum nano drum includes a nano-mechanical resonator, e.g., a vibrating nano drum, having two superconducting circuits, or cavities. Nano drums, or microscopic mechanical drums can be cooled to temperatures at which energy levels are low enough that most energy is devoid. With such low energy levels, sensors would be more capable of retaining information longer due to their increased sensitivity. The application of squeezed light to nano drums can be used in quantum computing to compute with minimal interference, increasing the potentially for exponentially faster computers.

Squeezed light is light with engineered uncertainty. The term squeezing thus refers to a reduced quantum uncertainty. In quantum physics, light is in a squeezed state, if its electric field strength E for some phases has a quantum uncertainty smaller than that of a coherent state. Squeezed light is the removal of tiny quantum fluctuations, called noise, in waves of light. Photons having been squeezed can be said to be in a squeezed state. The resulting squeezed light has a reduced quantum uncertainty. Ordinarily, light has equal uncertainty in phase and amplitude in its coherent state. When squeezed, the uncertainty is no longer equally divided. One can consider a process of squeezing light as a filter that purifies the photon beam along a particular axis of travel. Squeezed light states can then be used to produce one-sided device-independent quantum key distribution.

Squeezed light can be generated from light in a coherent state or vacuum state by using certain optical nonlinear interactions. For example, an optical parametric amplifier with a vacuum input can generate a squeezed vacuum with a reduction in the noise of one quadrature components by the order of 10 dB. A lower degree of squeezing in bright amplitude-squeezed light can under some circumstances be obtained with frequency doubling. The Kerr nonlinearity in optical fibers also allows the generation of amplitude-squeezed light. Semiconductor lasers can generate amplitude-squeezed light when operated with a carefully stabilized pump current. Squeezing can also arise from atom-light interactions. Amplitude squeezed, phase squeezed, a squeezed vacuum state has also a zero mean electric field but a phase-dependent uncertainty.

Spin squeezing photon can be applied according to a two-axis-twisting spin squeezing. A light pulse passes multiple times, e.g., three times, through an atomic ensemble placed within a magnetic field, with its polarization rotated by wave plates between the passes. The light exiting the system contains no information about the atomic spin, and the atomic spin is perfectly squeezed. For example, an all-optical interference-based approach manipulates a quantum noise of atoms and light, which provides a quantum erasure feature and enables a new scheme for TAT spin squeezing. At least one example squeezing approach employs an interference of three atom-light interactions, canceling entanglement between the atoms and the output light, but keeping the effective nonlinear interaction between atoms. Such a quantum erasure does not use detection or feedback, is loss tolerant, and is experimentally feasible. The illustrative example does not have special experimental requirements and involves only an ordinary polarized coherent laser beam under off-resonant Faraday interactions with an ensemble of warm or cold atoms. It is understood that other multi-pass schemes are available for quantum memory applications, but not necessarily for spin squeezing.

The photon storage device 232, sometimes referred to as a quantum memory can be composed of one or more of atoms, ions, nitrogen-vacancy diamonds, quantum dots, superconducting quantum interference devices, and/or other systems capable of representing and storage of quantum states. According to the illustrative example, the entangled photon storage device 232 uses a type of solid state medium rare-earth ion doped crystal such as yttrium orthosilicate doped with praseodymium ions. This storage technique has been well studied in laboratory conditions in terms of quantum computing but has not been combined with serialized twisted photon for the purpose of quantum repeating and/or amplification. According to the example embodiments, photon storage in solid crystals is used, because it meets strict quantum restrictions. For example, an yttrium orthosilicate (Y2SiO5) crystal doped with the rare earth element praseodymium, carefully tailored to have very specific absorption properties, as a quantum memory. The crystal memory absorbs a pulse of laser light. But when the external electric field is switched, the memory produces an "echo" of the original photons, their quantum state intact.

For example, photon |a' with serialized identification or label of "0000011001" or 12 in decimal, is provided as an input to a crystalline light storage 232, having a related or common superposition state with |a, it's entangled pair partner. When the photon |a' enters this crystal, its quantum state is replicated, without observation, within the harmonic vibration of the crystal, and the original photon |a' is destroyed. The crystal storage element resonates in such a way that matches the original quantum state of the input photon |a'. When the electric field polarity of the crystal storage element is reversed, a photon |a" is released with the same quantum state as the original photon. This could occur days, weeks, months, or years later. According to the illustrative example, the output photon |a" includes a serialization identification label of "0000011001" or 12 in decimal, with the same superposition state as |a'. Further mappings could reserve a set of bits for an owner or company, with the remaining bits providing the pair serial number. But these mappings are arbitrary, and depend on the business logic. Beneficially, the twisted light serializer 228 provides a means for mapping photons to their entangled partners.

By way of example, an entangled photon pair generator 230 generates entangled pairs by diagonally polarizing a single photon, e.g., using a wave plate, and then sending it through a compound lens, e.g., a barium borate crystal sandwich, which has a horizontal filter and a vertical filter sandwiched together. There is an equal chance that the emerging photon pair will be either both horizontally polarized or vertically polarized. A thin layer of barium borate induces the photon to split into two distinct entangled photons that are in a shared state of superposition (neither horizontal nor vertical but both until overserved).

Although the system elements of the example quantum repeater system 220 are presented in a particular order, it is understood that the ordering of one or more of the system elements can be changed. For example, the twisted light serializer 228 can be arranged before the quantum filter 221, or after the entangled photon pair generator 230 or between the crystalline light storage 232 and the quantum repeater 240. Alternatively or in addition, to tag the entangled photon pairs. Alternatively or in addition, the quantum filter 221 can be arranged after the twisted light serializer 228, or after the entangled photon pair generator 230, and/or after the crystalline light storage element 232 to filter the entangled photons and/or entangled photon pairs retrieved from the storage element 232.

Figure 2C:
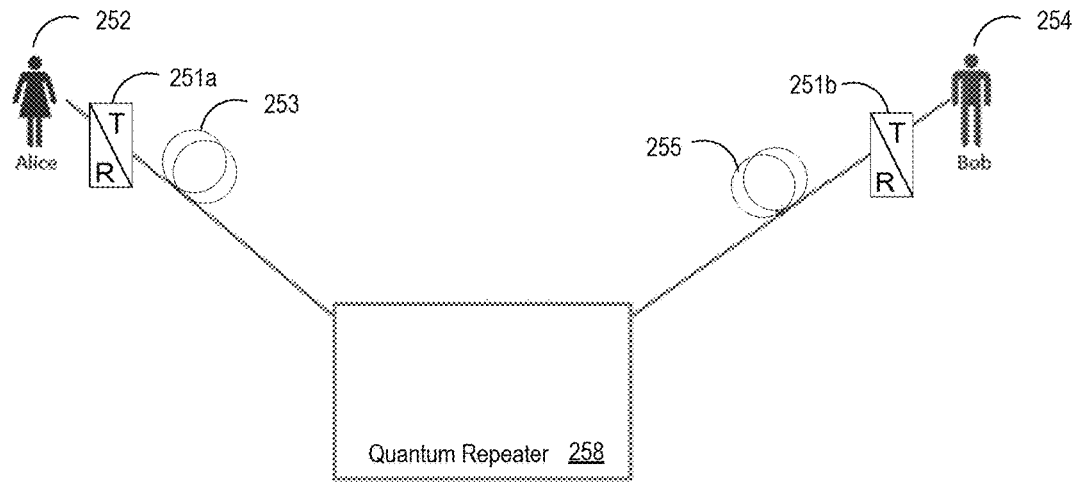
FIGS. 2C through 2H are block diagrams illustrating an example, non-limiting embodiment of a quantum repeater functioning within the communication network of FIG. 1, in accordance with various aspects described herein.

The quantum communication networks based on concepts of "quantum relays" can make it possible to cover larger distances. In such a network, pairs of entangled photons, that is to say tied by one of their quantum observables, propagate over short sections and are combined in cascade so as to cover a more considerable distance. FIGS. 2C through 2H are block diagrams illustrating an example, non-limiting embodiment of a quantum relay or repeater functioning within the communication network 100 (FIG. 1), in accordance with various aspects described herein. Referring first to FIG. 2C, a quantum network connection 250a provides for a communication of quantum information between remote end points: Alice 252 and Bob 254. Potential uses of such connections include the networking of quantum computers, and/or "quantum key distribution" (QKD), in which a quantum channel and an authenticated (but not necessarily secret) classical channel with integrity are used to create shared, secret, random classical bits. Generally, a processes used to convey quantum information over a quantum network connection provide degraded performance as the transmission distance increases thereby placing an upper limit between end points. Since in general it is not possible to copy a quantum state, the separation of endpoints cannot be increased by employing repeaters in the classical sense.

One way of transferring quantum information between two spaced locations uses the technique known as "quantum teleportation." This makes uses of two entangled qubits, known as a Bell pair, situated at respective ones of the spaced locations. The term "entanglement" is also used in the present specification to refer to two entangled qubits. The creation of such a distributed Bell pair is generally mediated by photons sent over an optical channel (for example, an optical waveguide such as optical fiber). Although this process is distance limited, where a respective qubit from two separate Bell pairs are co-located, it is possible to combine, or merge, the Bell pairs by a local quantum operation effected between the co-located qubits. This process, known as "entanglement swapping," results in an entanglement between the two non-collocated qubits of the Bell pairs while the co-located qubits cease to be entangled at all.

According to the illustrative example, a first quantum transceiver 251a is provided at a first endpoint 252, Alice, and a second quantum transceiver 251b is located at a second endpoint 254, Bob. Transmitter portions of each of the quantum transceivers 251a, 251b, generally 251, generate respective qubit pairs. The device hosting the co-located qubits and which performs the local quantum operation to merge the Bell pairs is called, a "quantum repeater" 258. The basic role of a quantum repeater 258 is to create a respective Bell pair with each of two neighboring spaced nodes 252, 254 and then to merge the Bell pairs. By chaining multiple quantum repeaters 258, an end-to-end entanglement can be created between end points separated by any distance, thereby permitting the transfer of quantum information between arbitrarily-spaced end points.

A first classical optical channel, or link 253, extends between the first end point 252 and the quantum repeater 258. A second classical optical channel, or link 255, extends between the second end point 254 and the quantum repeater 258. Photons can be transported between each of the end points 252, 254 and the quantum repeater 258 via their respective optical links 253, 255.

Figure 2D:
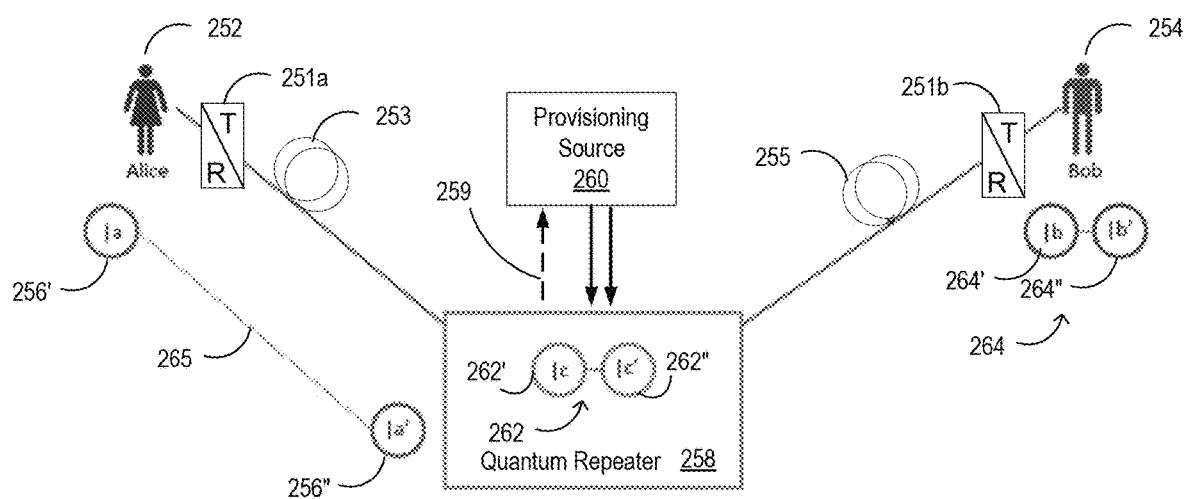

Referring next to FIG. 2D, a first entangled photon pair: Ia 256' and Ia' 256", generally 256, is generated by the transmitter portion of the first quantum transceiver 251a at the first endpoint 252. The entangled photons Ia 256' and Ia' 256" of the pair 256 are said to be in a superposition state. One photon, Ia' 256" of the first entangled photon pair 256 is transported to the quantum repeater 258 via the first optical link 253. A first entanglement 265 between the first photon 256' and the second photon 256" of the first entangled photon pair 356 persists, despite their being separated by a distance of the first optical link 253. Likewise, a second entangled photon pair: Ib 264' and Ib' 264", generally 264, is generated by the transmitter portion of the second quantum transceiver 251b at the second endpoint 254. The entangled photons Ia 264' and Ia' 264" of the pair 264 are also said to be in a superposition state.

A third entangled photon pair: Ic 262' and Ic' 262", generally 262, is obtained at the quantum repeater 258. Similarly, the entangled photons Ic 262' and Ic' 262" of the pair 262 are said to be in a superposition state. Preferably, the third entangled photon pair 262 represent a pumped pair, e.g., obtained from high energy photons of a laser pumped source at and/or in the vicinity of the provisioning source 260 and/or the quantum repeater 258. According to the illustrative example, a provisioning source 260 provides the third entangled pair 262 to the quantum repeater 258. In at least some embodiments, a control channel 259 is provided between the provisioning source 260 and the quantum repeater 258. Control information can be exchanged between the provisioning source 260 and the quantum repeater 258 via the control channel 259. By way of non-limiting example, the quantum repeater 258 may request a provisioning of an entangled photon pair via the control channel 259. The provisioning source 260, responsive to the request, generates and/or otherwise obtains an entangled photon pair, e.g., the third entangled photon pair 262 to fulfill the request. In some embodiments, the request is generated in response to transmission of the photon Ia' 256", and/or in response to receipt of the photon Ia' 256" and/or in response to anticipation of transmission and/or receipt of the photon Ia' 256".

In some embodiments, one or more of the quantum transceivers 251, the provisioning source 260 and/or the quantum repeater 258 include a pulsed light source light that generates first and second synchronized light pulses. A first atomic ensemble is optically coupled to the light source and having a first collective excitation state. The first light pulse has an energy that can excite the first atomic ensemble so as to generate first photons. A second atomic ensemble optically coupled to the light source has a second collective excitation state, wherein the second light pulse has an energy that can excite the second atomic ensemble so as to generate second photons. An interferer is optically coupled to the first and second atomic ensembles via respective first and second optical paths. The interferer is operable to interfere the first and second photons. First and second filters are respectively arranged in the first and second optical paths and respectively operable to prevent light other than the first and second photons from reaching the interferer. First and second single-photon detectors are optically coupled to the first and second atomic ensembles and configured to respectively detect the interfered first and second photons so as to establish entanglement between the first and second atomic ensembles. In at least some embodiments, a photodetector controller can be operably coupled to the first and second single-photon detectors and configured to control the detection of the interfered first and second photons at the first and second single-photon detectors.

Figure 2E:
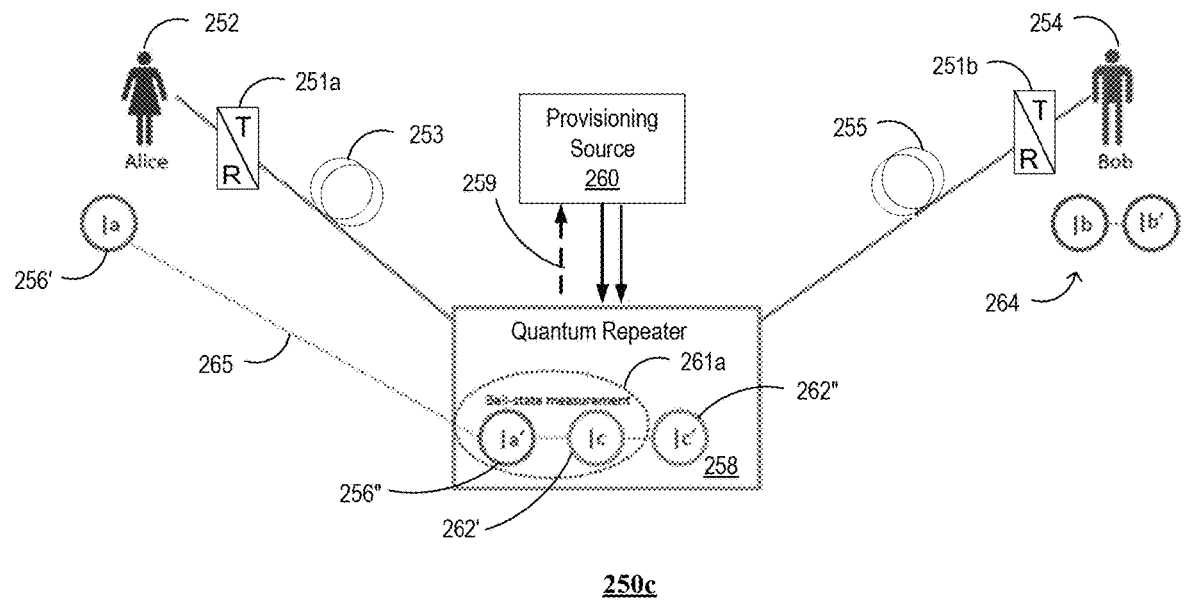
Figure 2F:
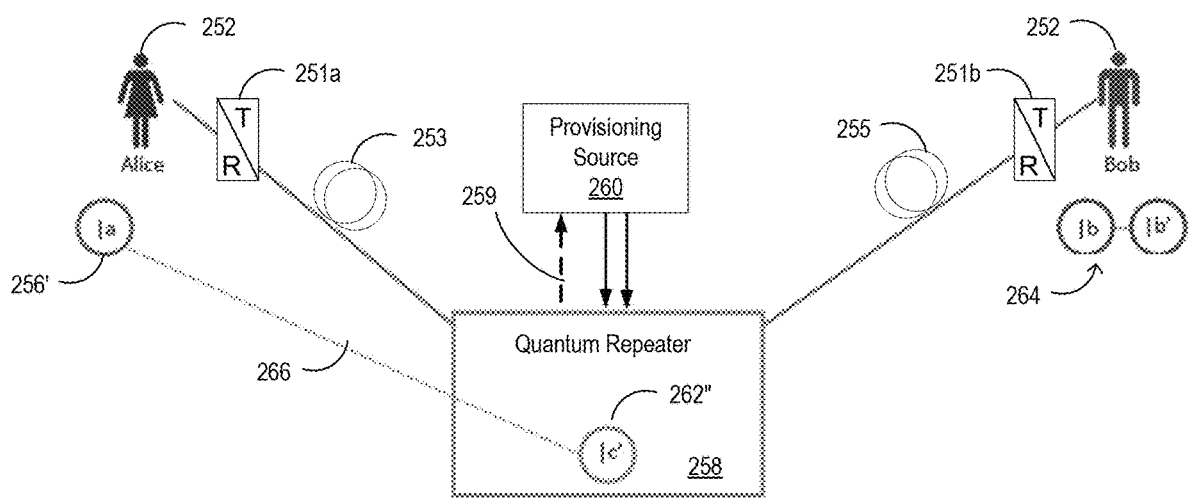

Referring next to FIG. 2E, a first Bell state measurement 261a is performed according to the received photon |a' 256" and a first photon |c 262' of the third entangled photon pair 262. In the illustrative example, the first Bell state measurement is performed at and/or in a vicinity of the quantum repeater 258. The first Bell measurement 261a results in a second entanglement 266 between the first photon |a 256' of the first entangled photon pair 256 and the second photon |c' 262" of the third entangled photon pair 262. Once again, the second entanglement 266 between the first photon |a 256' of the first entangled photon pair 256 and the second photon |c' 262" of the second entangled photon pair 262 persists, despite their being separated by a distance of the first optical link 253. The second photon |c' 262" of the third entangled photon pair 262, having a relatively high or pumped energy level, is transported to the second endpoint 252 via the second classical optical link 255.

Figure 2G:
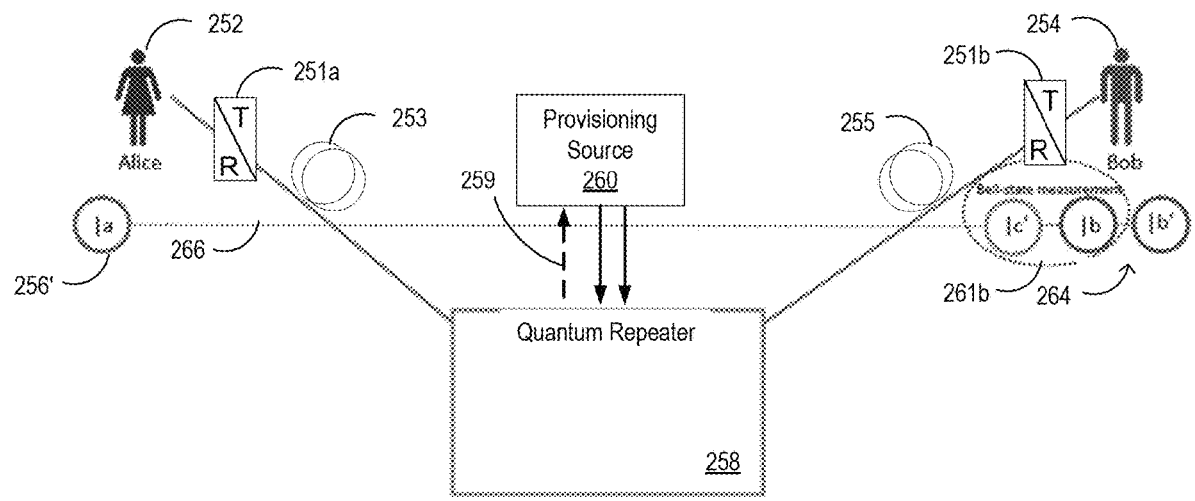
Figure 2H:
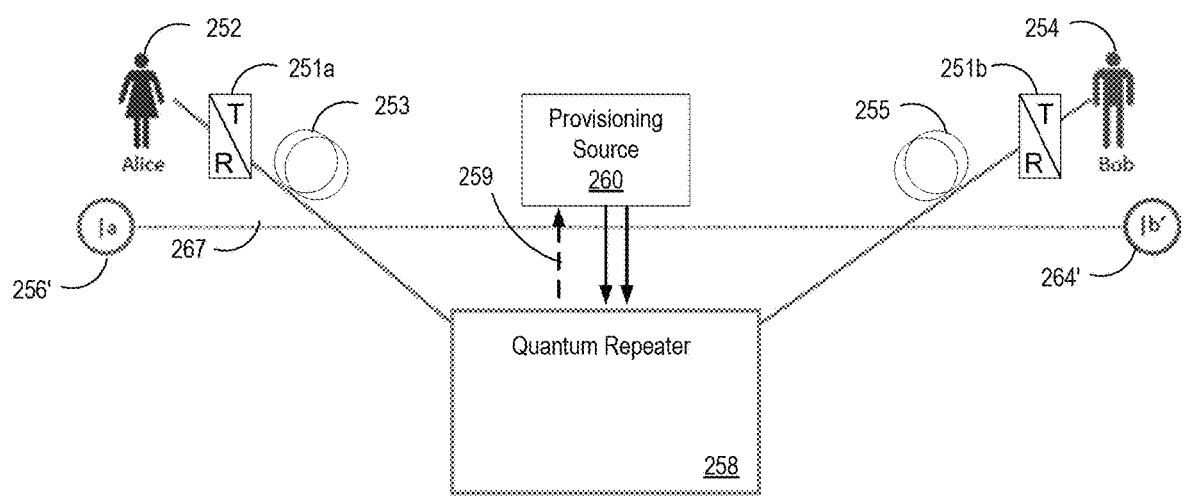

Referring next to FIG. 2G, a second Bell state measurement 261b is performed according to the received photon |c' 262" and a first photon |b 264' of the second entangled photon pair 264. In the illustrative example, the second Bell state measurement 261b is performed at and/or in a vicinity of the second endpoint 354, e.g., at a receiver, detector and/or analyzer portion of the second quantum transceiver 251b. The second Bell measurement 261b results in a third entanglement 267 between the first photon |b 264' of the second entangled photon pair 264 at the first endpoint 252 and the second photon |b' 264" of the second entangled photon pair 264. Once again, the third entanglement 267 between the first photon |a 256' of the first entangled photon pair 256 and the second photon |b' 264" of the second entangled photon pair 264 persists, despite their being separated by a combined distance of the first optical link 253 and the second optical link 255. The entangled photons |a 256' and |b' 264" are also said to be in a superposition state. The process is sometimes referred to as entanglement swapping.

It is understood that in at least some embodiments, one or more additional repeaters can be provided to extend the resulting quantum entanglement of the endpoints 252, 254 to more than two classical optical links, e.g., using more than one additional quantum repeaters 258 between optical link spans. The additional quantum repeaters 258 process qubits according to pumped quantum entangled photon pairs obtained locally using a local photon provisioning source.

Figure 2I:
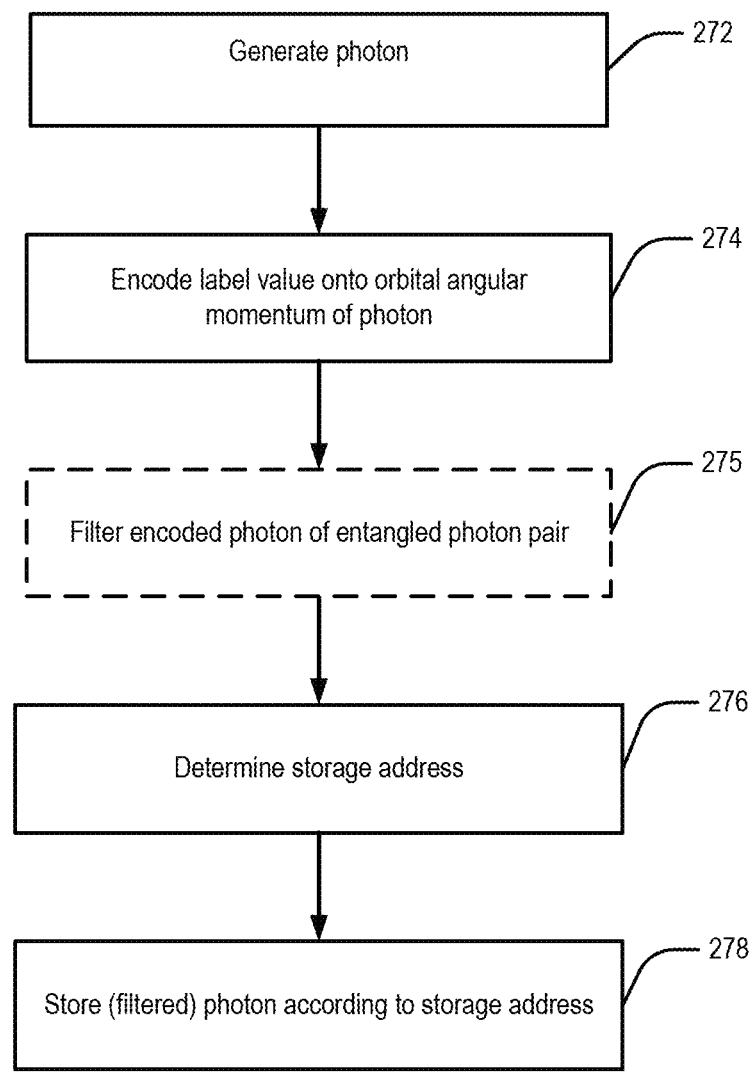
FIG. 2I depicts an illustrative embodiment of a process for storing a qubit in a storage element accordance with various aspects described herein.

FIG. 2I depicts an illustrative embodiment of a process 270 in accordance with various aspects described herein. According to the example process 270, a photon is generated at 272. The photon can be generated according to any photon generation technique known to those skilled in the art, including the examples disclosed herein, including the use of pulsed and or pumped coherent optical sources, e.g., lasers and/or laser diodes.

A label value is encoded onto an orbital angular momentum of the photon at 274. The label value generally represents a multi-bit value. In at least some instances, the multi-bit value has significance according to an intended application of the photon. For example, the multi-bit value can be used to identify the particular photon and/or photons of an entangled pair of photons. Alternatively or in addition, the multi-bit value can be used to associate the photon or entangled photon pair with a particular group of photons and/or group of entangled photon pairs. For example, a group of photons and/or entangled pairs of photons can be associated with a particular pulse of a pulsed optical communication system.

In at least some embodiments, at least a portion of the multi-bit value is relevant to in intended applicant of the photon. For example, the multi-bit value can include an encryption key, or at least a portion of an encryption key. It is understood that in at least some applications, an orbital angular momentum of a single photon or single entangled photon pair can be adjusted to impart sufficient number of twists to convey an entire key or key segment of a predetermined number of buts, e.g., 10 twists would be sufficient to convey 512 bits of information for a 512 bit secret encryption key.

In at least some embodiments, the encoded photon is filtered at 275. Filtering can include any filtering technique generally known to this skilled in the art including traditional optical filtering, e.g., according to wavelength, and/or quantum noise filtering according to quantized states of the photon.

A storage address is determined at 276. In some embodiments, the storage address can be determined according to a sequencer, e.g., assigning entangled photon pairs with distinguishable addresses that can be used to retrieve particular entangled photon pairs. Alternative or in addition, the storage address can be arranged to facilitate a first in-first out photon retrieval protocol. It is understood that the address can be determined according to one or more other entangled photon pair access protocols, such as last in-first out, first in-last out, and so on.

The encoded photon is stored in an optical storage element according to the storage address at 278. Storage of individual photons and/or entangled photon pairs can be accomplished using any photon storage technique generally known to those skilled in the art, including the example storage devices and techniques disclosed herein.

Figure 2J:
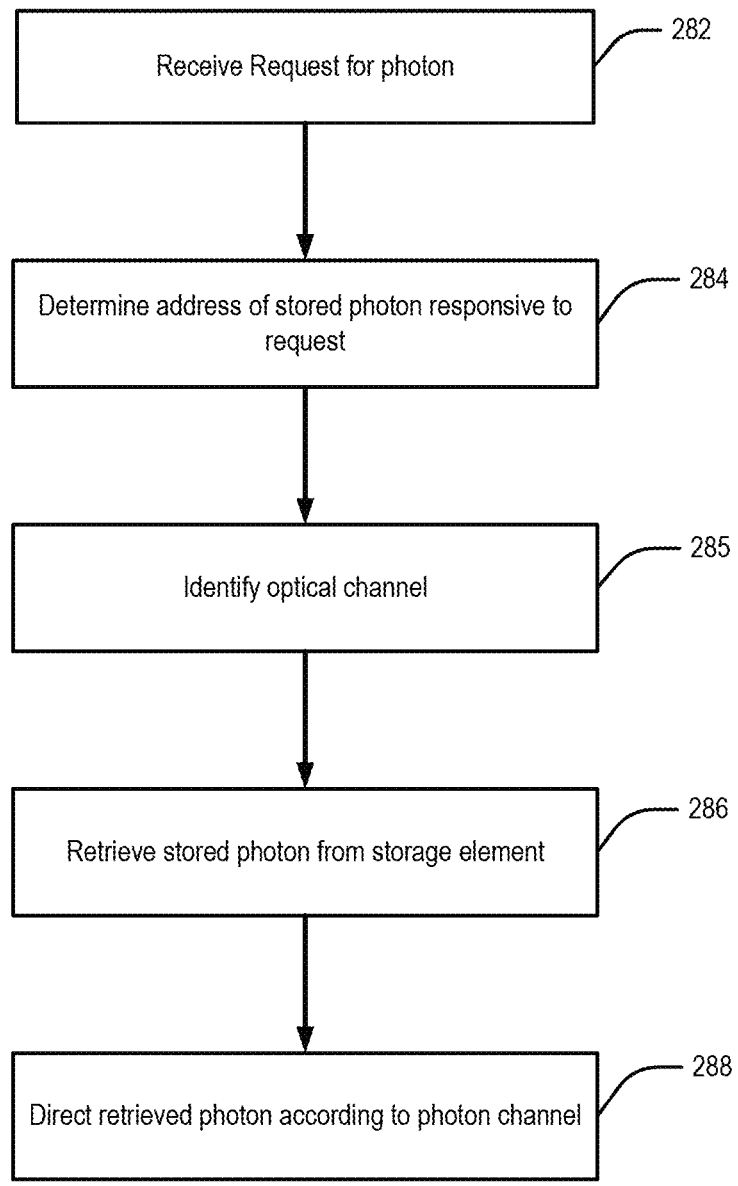
FIG. 2J depicts an illustrative embodiment of a process for retrieving a qubit from a storage element in accordance with various aspects described herein.

FIG. 2J depicts an illustrative embodiment of a process 270 in accordance with various aspects described herein. According to the example process 270 a request for a photon is received at 282. In some embodiments, the request can be from a processor, such as a controller implemented in a photon provisioning system.

An address of a stored photon is determined responsive to the request at 284. The address can be specific, e.g., for a particular photon and/or entangled photon pair. Such specificity can be employed when the photon provisioning system is supporting more than one quantum teleportation processes, more than one users, and/or more than one photons or entangled photo pairs of a particular group, e.g., a group associated with an optical pulse of a pulsed telecommunication system.

A classical optical channel is identified at 285. For example, the classical optical channel can be based on one or more endpoints of a quantum teleportation link between distant endpoints. The classical optical channel can include one or more of a free-space optical link or a guided optical link, e.g., a fiber optic link.

A stored photon is retrieved from the optical storage element at 286. The stored photon or entangled pair of photons can be retrieved from the optical storage element according to any optical storage and retrieval techniques generally known to those skilled in the art, including the examples provided herein.

The retrieved photon is directed toward a remote destination via the classical optical channel at 288. The photon can be coupled to a particular classical optical channel, e.g., a fiber optic communications link, to facilitate transport of the photon or entangled pair of photons to a predetermined node or destination.

Figure 2K:
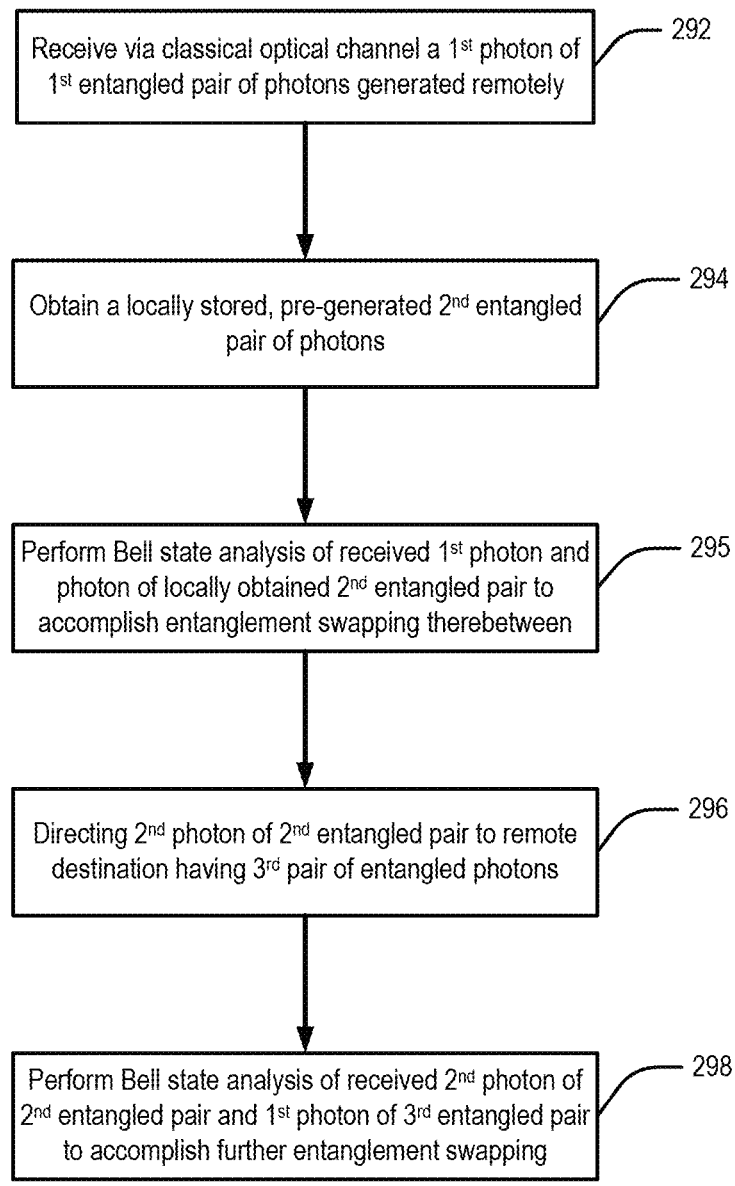
FIG. 2K depicts an illustrative embodiment of a process implemented by a quantum repeater in accordance with various aspects described herein.

FIG. 2K depicts an illustrative embodiment of a process 290 in accordance with various aspects described herein. According to the process 290, a first photon of an entangled pair of photons is received at 292. The photon is received via classical optical channel, such as a free-space optical channel, guided optical channel, e.g., a fiber optic waveguide, or a combination thereof. The first received photon is a member of a first entangled pair of photons generated remotely. This can include, for example, a second photon |a' 256" of the entangled pair of photons 256 received from Alice via the first optical channel 253 (FIG. 2D).

A locally stored, pre-generated second entangled pair of photons is obtained at 294. This can include, without limitation, generation of and/or access to a local entangled pair of photons 262 (FIG. 2D). Access to the local entangled pair can include access provided by the provisioning source 260, e.g., wherein the local entangled pair of photons 262 are obtained from a photon storage device 212, 232 of FIG. 2A or 2B.

A Bell state analysis is performed for the received first photon and the photon of locally obtained second entangled pair at 295 to accomplish entanglement swapping therebetween. For example, a Bell state analysis is performed on the second photon |a' 256" of the entangled pair of photons 256 received from Alice and a first photon |c 262' of the local entangled pair of photons 262 (FIG. 2E).

A second photon of the second entangled pair is directed at 296 to a remote destination having a third pair of entangled photons. For example, the second photon |c' 262" of the locally generated pair of photons is forwarded to a second remote node or destination corresponding to Bob 254, via a second optical channel 255 (FIG. 2G).

A second Bell state analysis of the received second photon 262" of the second entangled pair 262 and the first photon |b 264 of the third entangled pair 264 to accomplish further entanglement swapping at 298.

While for purposes of simplicity of explanation, the respective processes are shown and described as a series of blocks in FIGS. 2I through 2K, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. For example, the encoding step 274 can occur after the filtering step 275, when included in the process 270.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of communication network 100, the subsystems and functions of systems 200, 220, 250a through 250f and processes 270, 280 and 290 presented in FIGS. 1, 2A through 2K, and 3. For example, the communications network 100 can facilitate in whole or in part a provisioning of entangled photon pairs for quantum teleportation of information across the network 100. Provisioned photons of the entangled photon pairs can be filtered to reduce and/or substantially eliminate quantum noise. Alternatively or in addition, multiple bits of information can be encoded onto individual photons and/or entangled pairs of photons according to the photons' orbital angular momenta.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
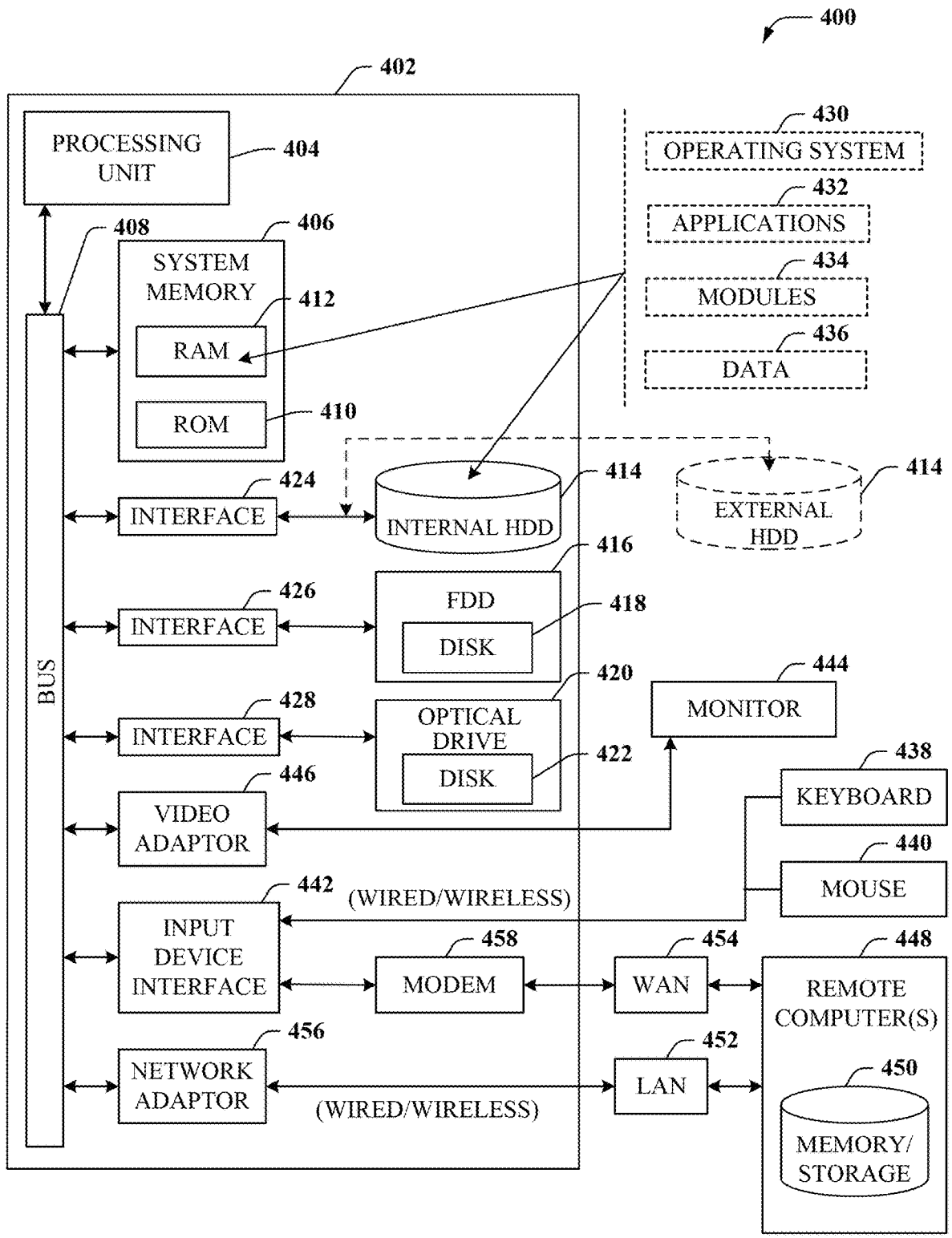
FIG. 4 is a block diagram of an example, non-limiting embodiment of a computing environment in accordance with various aspects described herein.

Turning now to FIG. 4, there is illustrated a block diagram of a computing environment 400 in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, the computing environment 400 can facilitate in whole or in part a provisioning of entangled photon pairs for quantum teleportation of information across the network 100 (FIG. 1). Provisioned photons of the entangled photon pairs can be filtered to reduce and/or substantially eliminate quantum noise. Alternatively or in addition, multiple bits of information can be encoded onto individual photons and/or entangled pairs of photons according to the photons' orbital angular momenta.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
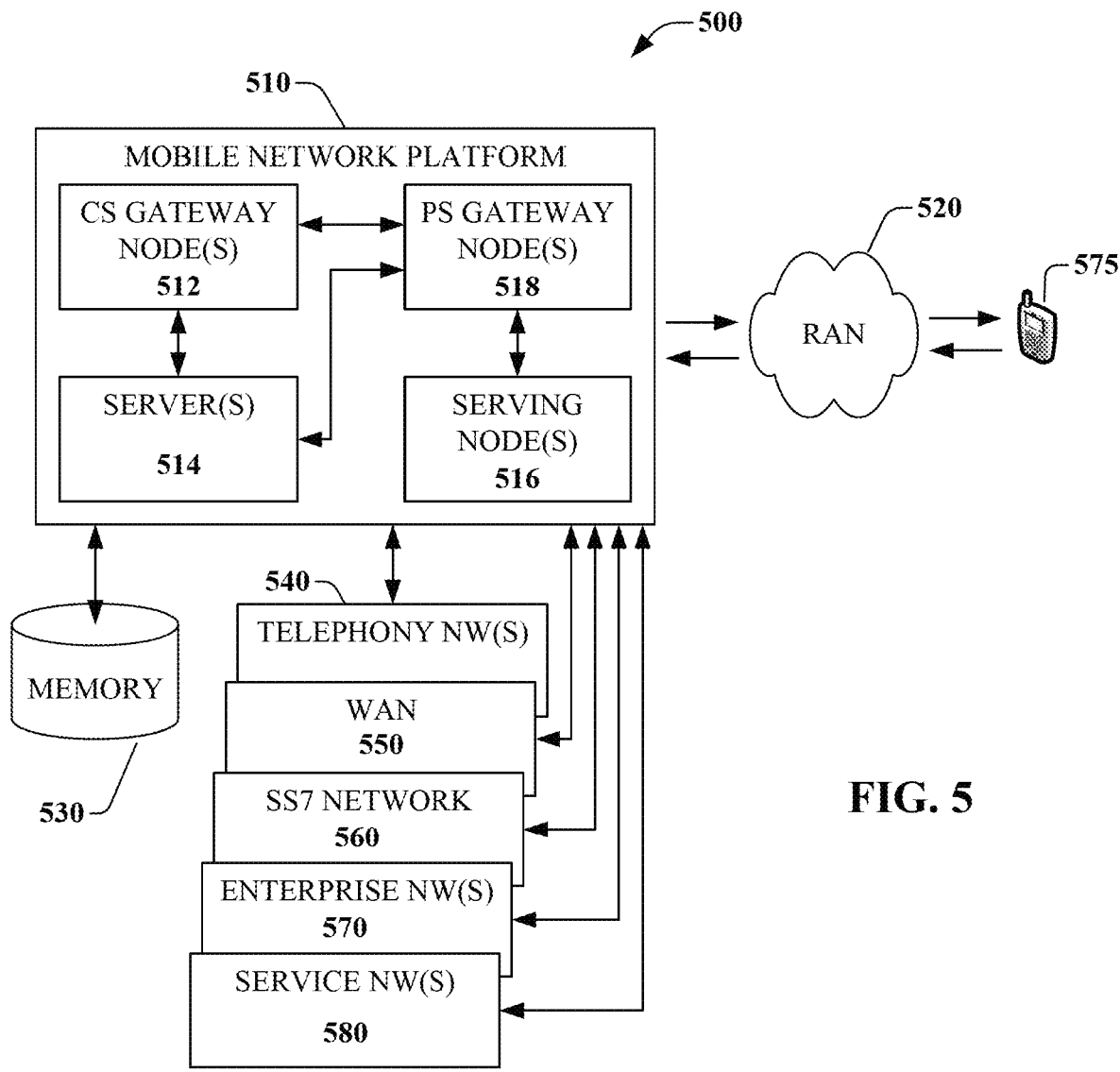
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, the embodiment 500 of a mobile network platform 510 can facilitate in whole or in part a provisioning of entangled photon pairs for quantum teleportation of information across the network 100 (FIG. 1), across and/or in cooperation with the virtualized network 300 (FIG. 3) and/or in cooperation with the computing environment 400 (FIG. 4). Provisioned photons of the entangled photon pairs can be filtered to reduce and/or substantially eliminate quantum noise. Alternatively or in addition, multiple bits of information can be encoded onto individual photons and/or entangled pairs of photons according to the photons' orbital angular momenta. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact.

Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
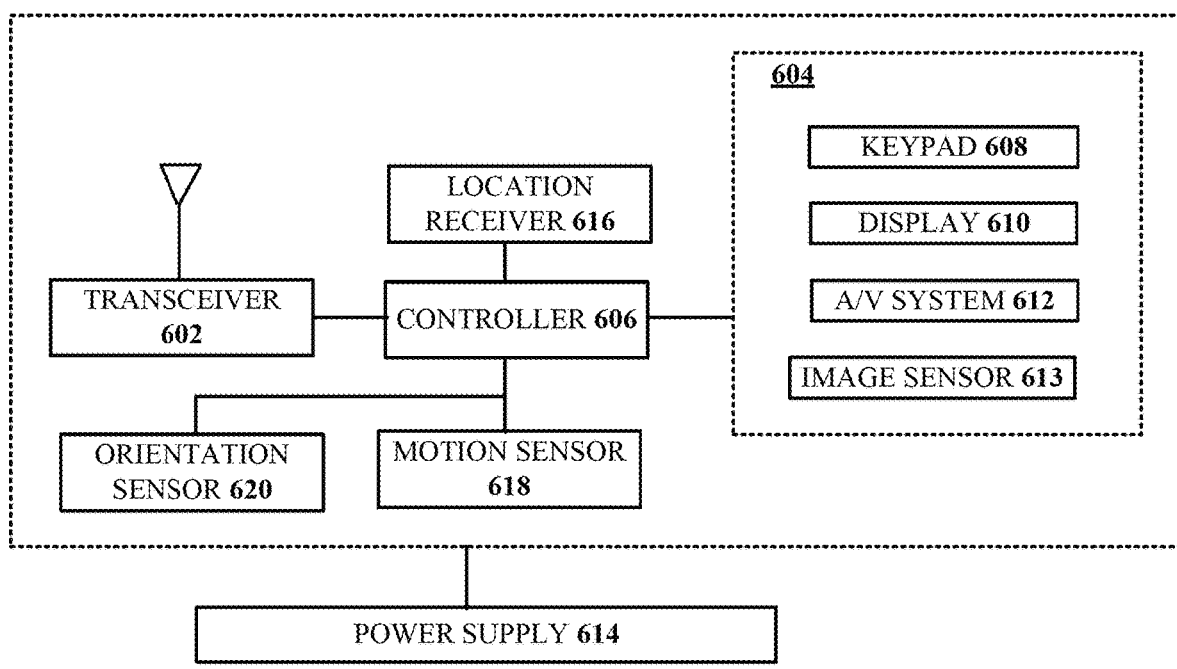
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, the communication device 600 can facilitate in whole or in part a provisioning of entangled photon pairs for quantum teleportation of information across the network 100 (FIG. 1), across and/or in cooperation with the virtualized network 300 (FIG. 3) and/or in cooperation with the computing environment 400 (FIG. 4), and/or in cooperation with the embodiment 500 of a mobile network platform 510 (FIG. 5).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/ communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
   determining by a processing system including a processor, for each photon of a pair of photons that will be quantum entangled, a respective multi-bit representation of a label value, each multi-bit representation comprising one bit that distinguishes one photon pair partner from another photon pair partner and one or more additional bits that characterize a serial number that is common to each photon pair partner;
   generating a photon to obtain a generated photon;
   generating a quantum entangled pair of photons based on the generated photon;
   encoding onto a first orbital angular momentum of a first photon of the quantum entangled pair of photons the label value according to the respective multi-bit representation;
   encoding onto a second orbital angular momentum of a second photon of the quantum entangled pair of photons the label value according to the respective multi-bit representation;
   applying a quantum state to the first photon of the quantum entangled pair of photons, while preserving the first orbital angular momentum according to the respective multi-bit representation of the label value;
   applying the quantum state to the second photon of the quantum entangled pair of photons, while preserving the second orbital angular momentum according to the respective multi-bit representation of the label value; and
   inputting, by the processing system, the first photon of the quantum entangled pair of photons to an addressable memory element, wherein a released photon is obtainable from the addressable memory element, wherein the released photon has the quantum state, and wherein the released photon has a third orbital angular momentum equivalent to the first orbital angular momentum.

2. The method of claim 1, wherein the encoding onto the first orbital angular momentum comprises adjusting, by the processing system, a phase adjusting element according to the respective multi-bit representation resulting in an adjusted phase adjusting element, and wherein interaction between the first photon of the quantum entangled pair of photons and the adjusted phase adjusting element sets the first orbital angular momentum.

3. The method of claim 2, wherein the phase adjusting element comprises a spiral phase plate, a hologram, a deformable mirror, a birefringent liquid crystal, or any combination thereof.

4. The method of claim 2, wherein the quantum state comprises a quantum spin, a polarization, or both.

5. The method of claim 1, wherein the inputting comprises:
   applying, by the processing system, a first electric field to a crystal storage element;
   directing, by the processing system, the first photon of the quantum entangled pair of photons to the crystal storage element; and
   altering, responsive to the applying of the first electric field, a harmonic vibration of the crystal storage element according to the quantum state of the first photon of the quantum entangled pair of photons.

6. The method of claim 5, further comprising:
   applying, by the processing system, a second electric field to the crystal storage element;

wherein, responsive to the applying of the second electric field, the released photon is released from the crystal storage element.

7. The method of claim 1, further comprising removing, by the processing system, unwanted quantum fluctuations from the photons of the quantum entangled pair of photons.

8. The method of claim 7, wherein the removing of the unwanted quantum fluctuations further comprises:
filtering, by the processing system, the quantum entangled pair of photons having substantially equal quantum uncertainty in phase and amplitude, wherein the filtering of the quantum entangled pair of photons results in an unequal division of the quantum uncertainty in phase and amplitude.

9. The method of claim 1, further comprising:
inputting, by the processing system, another photon of another quantum entangled pair of photons having a respective quantum state in the addressable memory element.

10. A system, comprising:
a processing system including a processor; and
a memory that stores executable instructions that, when executed by the processing system, facilitate performance of operations, the operations comprising:
generating a photon to obtain a generated photon;
identifying, for each photon of a pair of photons that will be quantum entangled, a respective multi-bit representation of a label value, each multi-bit representation comprising one bit that distinguishes one photon pair partner from another photon pair partner and one or more additional bits that characterize a serial number that is common to each photon pair partner;
generating a quantum entangled pair of photons based on the generated photon;
encoding onto a first orbital angular momentum of a first photon of the quantum entangled pair of photons the label value according to the respective multi-bit representation;
encoding onto a second orbital angular momentum of a second photon of the quantum entangled pair of photons the label value according to the respective multi-bit representation;
adjusting a quantum state of the first photon of the quantum entangled pair of photons, while preserving the first orbital angular momentum according to the respective multi-bit representation of the label value; and
sending the first photon of the quantum entangled pair of photons to enter an addressable memory element wherein a released photon is releasable from the addressable memory element, wherein the released photon has the quantum state, and wherein the released photon has a third orbital angular momentum equivalent to the first orbital angular momentum.

11. The system of claim 10, wherein the encoding onto the first orbital angular momentum comprises adjusting a phase adjusting element according to the respective multi-bit representation resulting in an adjusted phase adjusting element, wherein interaction between the first photon of the quantum entangled pair of photons and the adjusted phase adjusting element sets the first orbital angular momentum.

12. The system of claim 10, wherein the sending the first photon of the quantum entangled pair of photons to enter the addressable memory element further comprises:

applying a first electric field to a crystal storage element;
directing the first photon of the quantum entangled pair of photons to the crystal storage element; and
altering, responsive to the applying of the first electric field, a harmonic vibration of the crystal storage element according to the quantum state of the first photon of the quantum entangled pair of photons.

13. The system of claim 12, wherein the operations further comprise:
applying a second electric field to the crystal storage element;
wherein, responsive to the applying of the second electric field, the released photon is released from the crystal storage element.

14. The system of claim 12, wherein the operations further comprise removing unwanted quantum fluctuations from the first photon of the quantum entangled pair of photons.

15. A non-transitory machine-readable medium, comprising executable instructions that, when executed by a processing system including a processor, facilitate performance of operations, the operations comprising:
determining, a multi bit value for each photon of a pair of photons that will be quantum entangled, a respective multi-bit representation of a label value, each multi-bit representation comprising one bit that distinguishes one photon pair partner from another photon pair partner and one or more additional bits that characterize a serial number that is common to each photon pair partner;
generating a quantum entangled pair of photons;
adjusting a first orbital angular momentum of a first photon of the quantum entangled pair of photons to encode thereon the label value according to the respective multi-bit representation;
adjusting a second orbital angular momentum of a second photon of the quantum entangled pair of photons to encode thereon the label value according to the respective multi-bit representation;
applying a quantum state to the quantum entangled pair of photons, while preserving the first orbital angular momentum according to the respective multi-bit representation and while preserving the second orbital angular momentum according to the respective multi-bit representation; and
directing the first photon of the quantum entangled pair of photons to an addressable memory element adapted to store a plurality of photons, wherein a released photon is obtainable from the addressable memory element, wherein the released photon has the quantum state, and wherein the released photon has a third orbital angular momentum equivalent to the first orbital angular momentum.

16. The non-transitory machine-readable medium of claim 15, wherein the adjusting of the first orbital angular momentum comprises adjusting a phase adjusting element according to the respective multi-bit representation resulting in an adjusted phase adjusting element, and wherein interaction between the first photon of the quantum entangled pair of photons and the adjusted phase adjusting element sets the first orbital angular momentum.

17. The non-transitory machine-readable medium of claim 15, wherein the directing of the first photon of the quantum entangled pair of photons to the addressable memory element further comprises:
applying a first electric field to a crystal storage element;
directing the first photon of the quantum entangled pair of photons to the crystal storage element; and altering, responsive to the applying of the first electric field, a harmonic vibration of the crystal storage element according to the quantum state of the first photon of the quantum entangled pair of photons.

18. The non-transitory machine-readable medium of claim 17, wherein the operations further comprise:
applying a second electric field to the crystal storage element;
wherein, responsive to the applying of the second electric field, the released photon is released from the crystal storage element.

19. The system of claim 11, wherein the phase adjusting element comprises a spiral phase plate, a hologram, a deformable mirror, a birefringent liquid crystal, or any combination thereof.

20. The system of claim 10, wherein the quantum state comprises a quantum spin, a polarization, or both.

\* \* \* \* \*

UNITED STATES PATENT AND TRADEMARK OFFICE
CERTIFICATE OF CORRECTION

PATENT NO. : 11,387,913 B2
APPLICATION NO. : 16/426891
DATED : July 12, 2022
INVENTOR(S) : Timothy Innes It is certified that error appears in the above-identified patent and that said Letters Patent is hereby corrected as shown below:

In the Claims

Claim 15, Column 32, Line 22, please delete "a multi bit value".

Signed and Sealed this
Twenty-seventh Day of December, 2022

Katherine Kelly Vidal
*Director of the United States Patent and Trademark Office*